(12) United States Patent
Joergensen

(10) Patent No.: US 10,257,595 B2
(45) Date of Patent: *Apr. 9, 2019

(54) PTP TRANSPARENT CLOCK SYSTEM UPGRADE SOLUTION

(71) Applicant: IP GEM GROUP, LLC, Irvine, CA (US)

(72) Inventor: Thomas Joergensen, Soeborg (DK)

(73) Assignee: IP GEM GROUP, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,705

(22) Filed: Aug. 1, 2016

(65) Prior Publication Data

US 2016/0337730 A1   Nov. 17, 2016

Related U.S. Application Data

(62) Division of application No. 14/502,877, filed on Sep. 30, 2014, now Pat. No. 9,432,751.

(60) Provisional application No. 61/884,748, filed on Sep. 30, 2013.

(51) Int. Cl.
| | |
|---|---|
| *H04J 3/06* | (2006.01) |
| *H04Q 11/00* | (2006.01) |
| *H04B 10/40* | (2013.01) |
| *H04L 12/935* | (2013.01) |
| *H04L 12/931* | (2013.01) |
| *H04L 7/00* | (2006.01) |
| *H04J 14/02* | (2006.01) |

(52) U.S. Cl.
CPC ......... *H04Q 11/0005* (2013.01); *H04B 10/40* (2013.01); *H04J 3/0673* (2013.01); *H04J 3/0697* (2013.01); *H04J 14/02* (2013.01); *H04L 7/0075* (2013.01); *H04L 49/30* (2013.01); *H04L 49/40* (2013.01); *H04Q 11/0066* (2013.01); *H04J 3/0667* (2013.01); *H04J 14/0212* (2013.01); *H04Q 2011/0045* (2013.01)

(58) Field of Classification Search
None
See application file for complete search history.

(56) References Cited

U.S. PATENT DOCUMENTS

| | | | | |
|---|---|---|---|---|
| 6,201,792 B1 * | 3/2001 | Lahat | ........... | H04L 12/5602 370/236 |
| 6,728,492 B1 * | 4/2004 | Baroncelli | ........... | H04J 3/0623 370/509 |

(Continued)

OTHER PUBLICATIONS

John C. Eidson et al.; "Spider Transparent Clock", ISPCS 2008, International IEEE Symposium on Precision Clock Synchronization for Measurement, Control and Communication, Ann Arbor, Michigan, Sep. 22-26, 2008.

*Primary Examiner* — Kenneth N Vanderpuye
*Assistant Examiner* — Jai M Lee
(74) *Attorney, Agent, or Firm* — Glass & Associates; Kenneth Glass

(57) ABSTRACT

A transparent clock converter is interposed between a non-precision time protocol (non-PTP) enabled network node and other portions of the network. The transparent clock converter effectively converts the non-PTP node into a transparent clock node. In some embodiments the transparent clock converter includes physical layer devices, but not media access controllers.

11 Claims, 7 Drawing Sheets

(56) References Cited

U.S. PATENT DOCUMENTS

| | | | |
|---|---|---|---|
| 6,850,660 B2* | 2/2005 | Notani | H04J 14/0201 370/222 |
| 7,477,847 B2* | 1/2009 | Hofmeister | H04B 10/40 370/220 |
| 7,649,910 B1* | 1/2010 | Wechsler | H04J 3/0688 370/503 |
| 7,689,854 B2* | 3/2010 | Ilnicki | H04J 3/0667 370/350 |
| 7,778,283 B2* | 8/2010 | Eidson | H04J 3/0667 370/354 |
| 7,835,402 B2* | 11/2010 | Erich | H04J 3/0697 370/503 |
| 8,019,228 B2* | 9/2011 | Sone | H04Q 11/0005 370/507 |
| 8,335,437 B2* | 12/2012 | Zhao | H04J 3/0664 370/503 |
| 8,571,014 B2 | 10/2013 | Joergensen | |
| 8,693,506 B2* | 4/2014 | Hadzic | H04J 3/0697 368/46 |
| 8,712,244 B2* | 4/2014 | Hasegawa | H04J 3/0655 398/102 |
| 8,718,482 B1* | 5/2014 | Roberts | H04B 10/27 398/102 |
| 9,042,366 B2* | 5/2015 | Swartzentruber | H04L 41/147 370/350 |
| 9,252,903 B2* | 2/2016 | Flinn | H04L 43/0852 |
| 9,258,073 B2* | 2/2016 | Le Pallec | H04J 3/0697 |
| 9,432,751 B2* | 8/2016 | Joergensen | H04Q 11/0005 |
| 9,742,514 B2* | 8/2017 | Zhao | H04J 3/0697 |
| 2002/0085591 A1* | 7/2002 | Mesh | H04L 29/06 370/535 |
| 2003/0039014 A1* | 2/2003 | English | H04B 10/801 398/164 |
| 2003/0180047 A1 | 9/2003 | Way | |
| 2004/0172444 A1* | 9/2004 | Nakamura | H04Q 11/0005 709/200 |
| 2006/0187972 A1 | 8/2006 | Aono | |
| 2009/0067850 A1* | 3/2009 | Mizutani | H04J 3/0605 398/154 |
| 2009/0297146 A1* | 12/2009 | Pessoa | H04W 88/14 398/45 |
| 2009/0297164 A1* | 12/2009 | Horiuchi | H04J 3/0682 398/154 |
| 2011/0051754 A1* | 3/2011 | Lansdowne | H04J 3/0673 370/503 |
| 2011/0087803 A1* | 4/2011 | Sun | H04J 3/0673 709/248 |
| 2011/0222560 A1* | 9/2011 | Biederman | H04J 3/0685 370/503 |
| 2012/0027414 A1* | 2/2012 | Wei | H04J 3/0655 398/100 |
| 2012/0106976 A1* | 5/2012 | Bernard | H04J 3/0647 398/154 |
| 2014/0226984 A1* | 8/2014 | Roberts | H04B 10/27 398/66 |
| 2015/0016478 A1* | 1/2015 | Joergensen | H04J 3/0667 370/512 |
| 2016/0112185 A1* | 4/2016 | Yin | H04J 3/0655 398/58 |

* cited by examiner

PTP TRANSPARENT CLOCK SYSTEM UPGRADE SOLUTION

CROSS REFERENCE TO RELATED APPLICATION

This application claims the benefit of the filing of U.S. Provisional Patent Application No. 61/884,748, filed on Sep. 30, 2013, the disclosure of which is incorporated by reference herein.

BACKGROUND OF THE INVENTION

The present invention relates generally to timing synchronization in communication systems and, more particularly, to timing synchronization for non-timing aware network nodes.

It is often advantageous in a communication network for devices in the network to have a common time base. For example, in 3G mobile/cellular communication systems, radio base stations (RBS) are synchronized to within a few microseconds. Precise synchronization facilitates efficient communication such as for allocation of time slots among devices and interference reduction. The electronics industry has developed several standard protocols for use in synchronizing clocks, for example, the Precision Time Protocol (PTP) of IEEE Std. 1588. PTP includes sending timing-related messages between nodes in a communication network. The timing-related messages include, for example, a first node transmitting over a link a time-stamped packet to supply its time base to a second node, and the second node transmitting, over the link, a packet to the first node requesting and thereafter receiving a reply with the time of receipt of the request packet, so that the second node may have information regarding packet time of travel over the link. With these timing related messages the second node may be able to synchronize its local clock to the clock time of the first node.

In many instances a network could have multiple nodes between nodes which are to be synchronized. Not surprisingly, a variety of constructs have been developed relating to timing distribution, and nodes may serve as or be identified as master clocks, boundary clocks, ordinary clocks (a category that may include master clocks), and transparent clocks, for example. The use of such constructs has been helpful in synchronizing nodes of larger networks.

Unfortunately, larger networks may also have many nodes which are not configured for PTP operations.

BRIEF SUMMARY OF THE INVENTION

Aspects of the invention provide for a stand-alone system for providing a precision time protocol unaware network node transparent clock operation. In one aspect the invention provides a network device in an optical network, comprising: a line side optical transceiver; a switch side optical transceiver; and a first physical layer device coupled to the line side optical transceiver and the switch side optical transceiver, the first physical layer device configured to receive a packet in the form of serial data from the line side optical transceiver, place a value indicating a time of reception of the packet received from the line side optical transceiver in a reserved field of the packet and provide the packet in the form of serial data to the switch side optical transceiver.

In another aspect the invention provides a method of providing transparent clock functionality for a optical network node, comprising: receiving a packet in optical form by a transparent clock converter; converting the packet into an electrical form; setting a reserved field of the packet to an ingress time of the packet into the transparent clock converter; converting the packet with the set reserved field into an optical form by the transparent clock converter; receiving the packet with the set reserved field in optical form by a network switch; performing network routing by the network switch; transmitting the packet with the set reserved field in optical form by the network switch; receiving, from the network switch, the packet with the set reserved field in optical form by the transparent clock converter; converting the packet with the set reserved field into an electrical form by the transparent clock converter; and setting a correction field of the packet to a value equal to a prior value of the correction field plus an expected egress time of the packet from the transparent clock converter and minus the ingress time of the packet into the transparent clock converter.

In another aspect the invention provides a method performed by a network device, the network device having a line side and a switch side, the line side coupled to remote network nodes by way of line-side optical connections, the switch side coupled to a switch local to the network device by way of switch-side optical connections, the method comprising: receiving a precision time protocol packet over a first of the line-side optical connections; setting a reserved field of the packet to a value indicating an ingress time of the packet into the network device; transmitting the packet over a first of the switch-side optical connections; receiving the packet over a second of the switch-side optical connections; adjusting a correction field of the packet to reflect a difference between an expected time of transmission of the packet over a second of the line-side connections and the value of the reserved field; and transmitting the packet over the second of the line-side optical connections.

These and other aspects of the invention are more frilly comprehended upon review of the disclosure.

DETAILED DESCRIPTION

Figure 1:
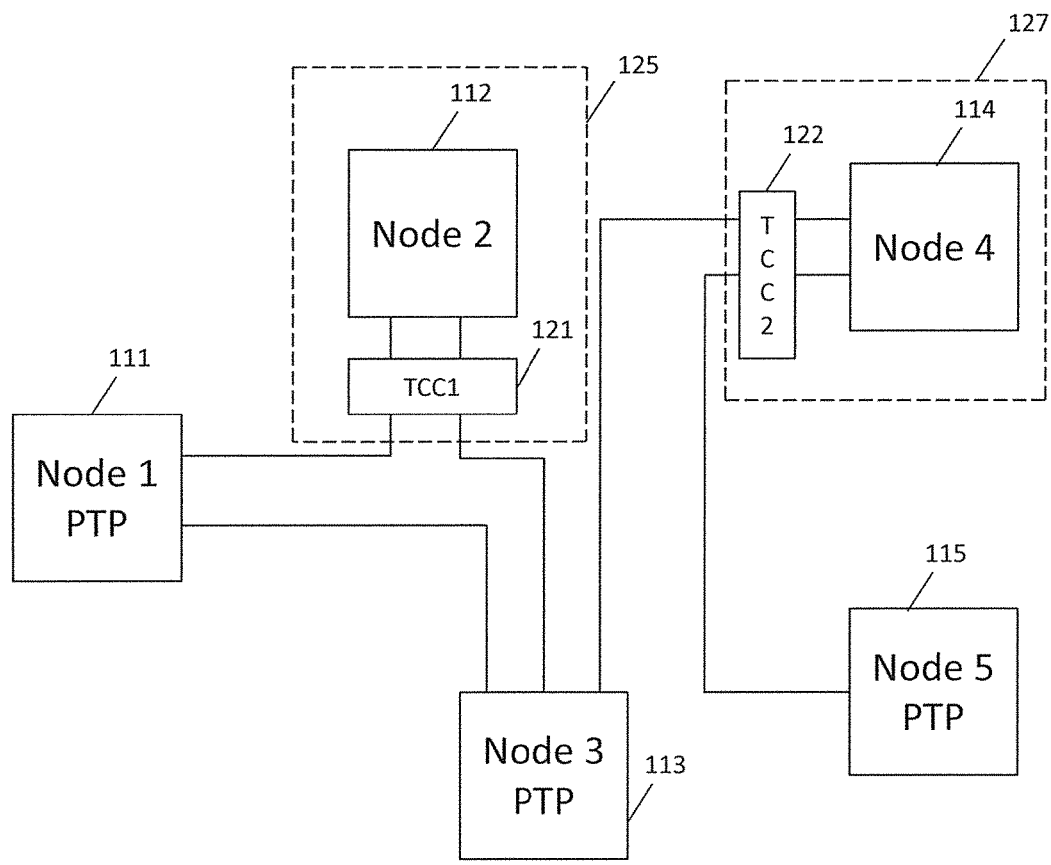
FIG. 1 is a block diagram of portions of a communications network in accordance with aspects of the invention.

FIG. 1 is a block diagram of portions of a communications network in accordance with aspects of the invention. The portions of the communications network illustrated include 5 nodes. A first node 111 is a PTP-aware node, that is, the first node processes packets in accordance with the Precision Time Protocol. The first node is coupled to a second node 112 and a third node 113, with the second node also coupled to the third node. The third node is also a PTP-aware node, and the first node and the third node may synchronize their clocks using PTP operations. In some embodiments the first node may provide a master clock and the third node may provide a boundary clock, for example, although in various embodiments the determination of which node includes the master clock will generally be determined using a best master clock algorithm (BMCA).

The second node is not configured to process PTP packets in accordance with the PTP protocol. The second node is therefore not a PTP-aware node, instead the second node is a PTP-unaware node. It is possible that some packets communicated between the first and third nodes may pass through the second node, depending on various packet and network parameters. In such an event, such packets may cause difficulties in achieving or maintaining proper time synchronization of the first and thirds nodes.

A first transparent clock converter 121, however, couples the second node with the first and third nodes. The first transparent clock converter is generally placed about a line side of the node, and the first transparent clock converter implements a PTP transparent clock for the node. The first transparent clock converter may implement the PTP transparent clock by determining a transit time of a packet through the node, and setting a value in the packet indicative of the transit time. Placement of the first transparent clock converter on the line side of the second node may be considered to convert the second node from a PTP-unaware node to a PTP transparent clock node 125.

In some embodiments the first transparent clock converter may implement the PTP transparent clock by adjusting a correction field of the packet to account for the transit time through the node. In some embodiments the first transparent clock converter may implement the PTP transparent clock by writing to a reserved field of the packet a first time reflective of a time at which the packet passes through the transparent clock converter on the way to the node, determining a second time reflective of a time at which the packet passes through the transparent clock converter on its return through the transparent clock converter, and adjusting the correction field of the packet to include the difference between the second time and the first time. In some embodiments the first time is a time of ingress of the packet to the transparent clock converter, and in some embodiments the second time is a time of egress of the packet from the transparent clock converter. In various embodiments, the time of egress is an estimated time of egress, with in some embodiments the transparent clock converter determining the estimated time of egress by determining a current time and adding to the current time a value indicative of time spent by the packet as it passes from its location at the current time to the point of egress from the transparent clock converter. In some embodiments the time used by the transparent clock converter is maintained by the transparent clock converter without reference to clocks maintained elsewhere in the network. In some embodiments the transparent clock converter syntonizes its clock to another clock in the network.

The third node is also coupled to a fourth node 114. The fourth node, in turn, is also coupled to a fifth node 115. The fifth node, like the first and third nodes, is a PTP-aware node, while the fourth node is not. The fourth node, like the second node, is a PTP-unaware node. The fifth node's coupling to another PTP-aware node, the third node in this case, is through the fourth node. The presence of the fourth node in the third node-to-fifth node communication path may, as was the case for the second node, cause difficulties in achieving or maintaining proper time synchronization of the fifth node with the third node, or with the first node for that matter.

Accordingly, as with the second node, a second transparent clock converter 122 couples the fourth node with the third and fifth nodes. The second transparent clock converter effectively converts the fourth node to a PTP transparent clock node 127. The second transparent clock converter is, in most embodiments the same as or similar to the first transparent clock converter.

In some embodiments communications between the first node and the fifth node may be routed through the third node and the fourth node. In some such embodiments the first node may serve as a master clock, with the first node and the third node synchronizing their clock through a PTP process. The PTP process may include transmission of Sync messages from a node serving as a master clock to other nodes in a PTP domain. The Sync message may include a time stamp indicating time of transmission of the sync message, or the time of transmission may be sent in a later Follow-up message. In some embodiments Sync messages may be transmitted by the master on a regular or somewhat regular basis, allowing clocks of other nodes to be syntonized to the master clock based on the Sync messages. Nodes with the other clocks also send Delay_Req messages to the node with the master clock, with the node with the master clock responding with a Delay_Resp message, which includes time of receipt by the master of the Delay_Req message. The clocks of the other nodes may be synchronized to the master clock utilizing time of transmission and/or receipt of the various messages. In application of such a process, the second and fourth nodes of the system of FIG. 1 may be considered to implement a transparent clock, effectively allowing for masking of delays of signals through those nodes.

Figure 2:
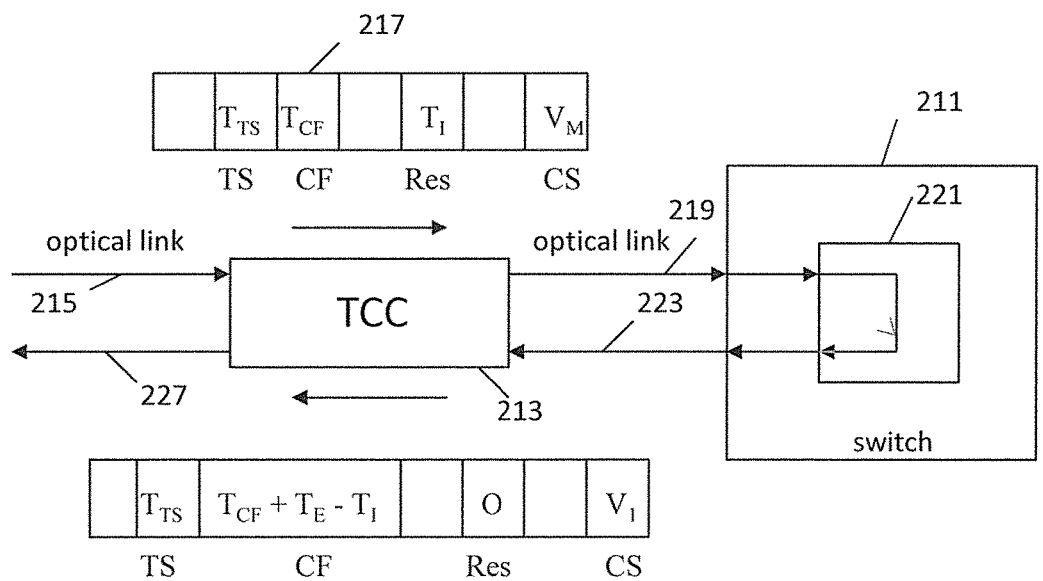
FIG. 2 is a block diagram of a network node in a communications network in accordance with aspects of the invention.

FIG. 2 is a block diagram of a network node in a communications network in accordance with aspects of the invention. As illustrated in FIG. 2 the node includes an Ethernet switch 211 and a transparent clock converter 213. The transparent clock converter (TCC) is placed topologically on a line side of the switch, with the TCC coupling the switch to network optical links 215, 227 of an optical network. The switch performs routing operations for packets communicated over a network, in some embodiments an electrical network and in some embodiments an optical network, and is configured to receive packets and transmit packets over links, for example optical links including optical link 219 and optical link 223. It should be recognized, however, that while optical links 215 227, and 219, 223, respectively, are shown as separate parallel physical fibers, in various embodiments the illustrated links may be on the same fiber, for example through use of wavelength division multiplexing (WDM) or dense wavelength division multiplexing (DWDM) or the like.

The TCC provides the switch, or bounds the switch by, a PTP transparent clock. For packets inbound to the switch, the TCC determines if the packet is a PTP packet, for example by examining a header of the packet. If the packet is a PTP packet, the TCC sets a predetermined reserved field (Res) of the packet to a value indicative of a time of ingress ($T_I$) of the packet into the TCC from the network link, which may be an optical link. In various embodiments the TCC also recalculates a checksum (CS) value for the packet, replacing the checksum value with the recalculated checksum, which takes into account the new value of the reserved field. In various embodiments the checksum may be a frame checksum sequence (FCS) and/or IP/UDP checksums, and in various embodiments more than one checksum may be recalculated and replaced for a particular packet. A representative inbound packet, after modification, is shown as item 217, with the inbound packet including a time stamp field (TS), a correction field (CF), the predetermined reserved field (Res), and a checksum field (CS). The time stamp field includes a value indicative of a time stamp value ($T_{TS}$) the correction field includes a value of a correction time ($T_{CF}$), with for example both values having been set (by other nodes) in accordance with the Precision Time Protocol. In some embodiments the TCC also sets a further predetermined reserved field to a flag setting, indicating that the TCC has modified the ingress PTP packet (the PTP packet in-bound to the switch) to allow for transparent clock operations.

For packets outbound from the switch, the TCC determines if the packet is a PTP packet that has been processed by the TCC in the inbound direction. For example, in some embodiments the TCC examines a header of the outbound packet to determine if the packet is a PTP packet, and examines the reserved field to determine if the reserved field has a value indicative of inbound processing by the TCC. For example, in some embodiments a non-zero value in the reserved field indicates inbound processing by the TCC, in some embodiments a value within a predefined value in the reserved field indicates inbound processing by the TCC. As an example, processing of the packet by the switch 211 may be expected to fall within a range of time values, and if the reserved field of the packet indicates a time of ingress to the TCC consistent with processing by the switch, considering a current time, the packet may be considered to have had inbound processing by the TCC. In some embodiments, however, the TCC may simply examine to other predetermined reserved field for a flag indicating that the packet was processed for transparent clock operations while on its inbound path.

For PTP packets that have had inbound processing by the TCC, the TCC determines a time of egress ($T_E$) of the packet from the TCC, and updates the correction field of the packet to include an indication of an amount of time spent by the packet traversing the TCC and the switch. In some embodiments the correction field is updated by adding to the correction field a difference between the time of egress and the time of ingress indicated by the reserved field. For example, in some embodiments the outbound packet received by the TCC includes a value $T_{CF}$ in the correction field, and the TCC updates the correction field to a value $T_{CF}+T_E-T_I$. In most embodiments the TCC then sets the predetermined reserved field to zero, updates any checksum fields to indicate appropriate checksum values, and transmits the packet over the optical link 227.

In some embodiments the TCC only processes packets that are inbound to the switch on full-duplex links, as in some embodiments performance of the transparent clock operations of the TCC generate a delay between the switch and other network nodes inconsistent with half-duplex operations.

Figure 3:
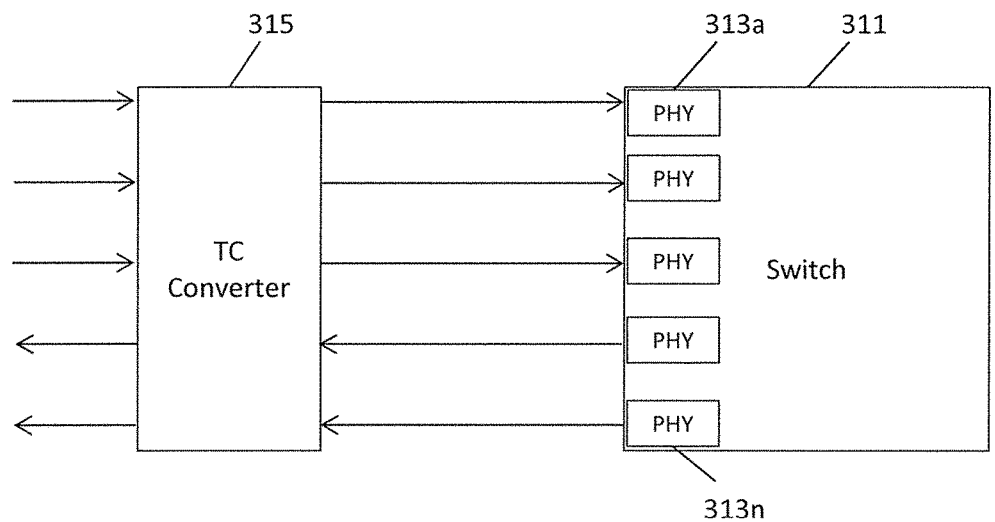
FIG. 3 is a further block diagram a network node in a communication network in accordance with aspects of the invention.

FIG. 3 is a further block diagram a network node in a communication network in accordance with aspects of the invention. The node includes a switch 311 for routing of packets. The switch is a PTP-unaware switch, in that the switch and its components do not perform PTP processing. Physical layer devices (PHYs) 313a-n of the switch transmit and receive packets from a link. In some embodiments the links may be electrical links, and in some embodiments the links may be optical links, and the switch may have optical devices, such as optical transceivers, which may be in the form of small form factor pluggable transceivers (SFPs), or their variations, interposed between the PHYs and the links.

The switch is coupled to other nodes of a communication system by a transparent clock converter (TCC) 315. In many embodiments the TCC is coupled to the switch by way of optical links, and is coupled to other nodes of the communication system by other optical links. In such embodiments the TCC may have SFP transceivers or the like for transmitting and receiving data on the optical links to the switch, and also have SFP transceivers or the like for transmitting and receiving data on the other optical links coupling the TCC to the other nodes of the communication system. In some embodiments there is a one-to-one correspondence between optical links coupling the TCC to other nodes of the communication system and optical links coupling the TCC to the switch. In some such embodiments, a packet inbound to the TCC from one of the optical links coupling the TCC and the other nodes is provided by the TCC to the switch on a corresponding TCC/switch optical link, received back from the switch by the TCC on another optical link (due for example to switch operations), and provided by the TCC to another node on an optical link corresponding to the other TCC/switch optical link.

For PTP packets received from the other nodes, the TCC is configured by circuitry for setting a predetermined reserved field of the PTP packets to a time of ingress of the packet to the TCC. For PTP packets received from the switch, the TCC is configured by circuitry for determining a time of egress of the packet from the TCC (to another network node), and, using the value in the predetermined reserved field, set a correction field of the PTP packet to a value including the difference between the time of egress and the time of ingress, with the difference representing time spent by the packet traversing the TCC and the switch. If the correction field, prior to such an operation, is set to zero, the TCC sets the correction field to a value indicative of the difference between the time of egress and the time of ingress. If the correction field, prior to such an operation, is set to a non-zero value, the TCC sets the correction field to a value indicative of that non-zero value plus the difference between the time of egress and the time of ingress.

Figure 4:
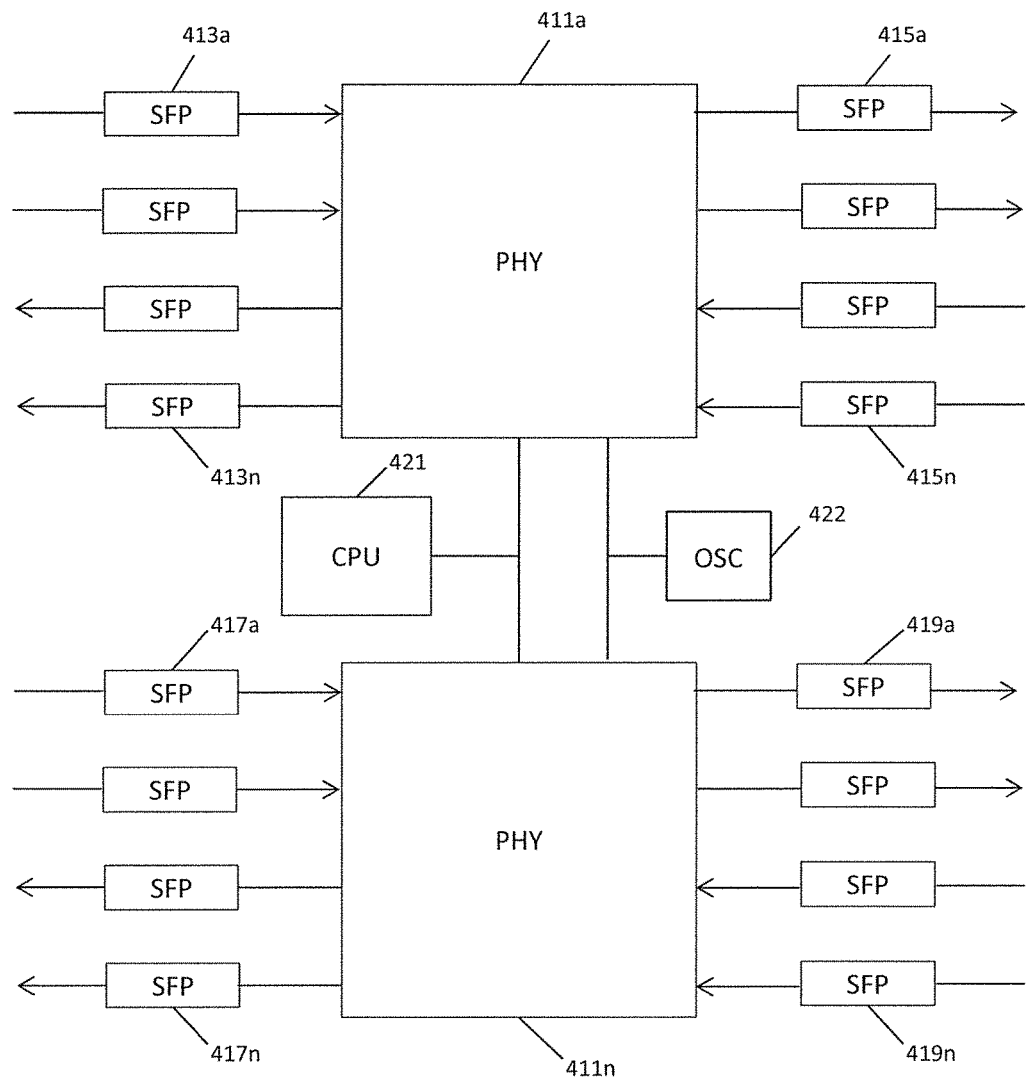
FIG. 4 is a block diagram of a TCC in accordance with aspects of the invention.

FIG. 4 is a block diagram of a TCC in accordance with aspects of the invention. In some embodiments the TCC of FIG. 4 may be used as a TCC of FIGS. 1-3. The TCC includes a plurality of physical layer devices (PHYs) 411a-n (with only two PHYs explicitly shown in FIG. 4). A first PHY 411a is coupled to optical links to a switch by SFPs 415a-n, and coupled to other optical links to other network nodes by SFPs 413a-n. The optical links to the switch may be considered an equipment side of the TCC, and the other optical links to the other network nodes may be considered a line side of the TCC. A plurality of second PHYs, including nth PHY 411n, are coupled to optical links to the switch, with the nth PHY being coupled to optical links to the switch by SFPs 419a-n. The second PHYs are also coupled to other optical links to other network nodes by SFPs, with the nth PHY 411n being shown as being coupled to other optical links by SFPs 417a-n.

In the embodiment of FIG. 4, the TCC includes a small CPU 421 coupled to the PHYs, for example using a Media Independent Interface Management bus. In some embodiments the CPU configures the PHYs to operate in a desired configuration, for example when the PHYs are configurable to operate in any of a plurality of configurations and a particular configuration is desired for the TCC. In some embodiments the CPU monitors equipment side auto-negotiation by the PHY and commands the PHYs to configure line side modes to be in conformance with a mode indicated by the equipment side auto-negotiation. In some embodiments the CPU also provides for initial synchronization of a time base of the PHYs, with the PHYs maintaining timing synchronization through reception of a common clock signal from a common clock source 422. In some embodiments the PHYs, SFPs, and CPU are housed in a housing separate and apart from the switch.

In operation, packets inbound to the switch from other network nodes are received over the other optical links, converted from optical signals to electrical signals by the SFPs coupled to the other optical links, and provided to the PHYs as part of serial data streams. The PHYs determine if the packet is a PTP packet, and if so insert a value indicative of a time of ingress of the packet to the TCC in a predetermined reserved field of the packet. In some embodiments the PHYs also set a flag in the packet indicating that inbound transparent clock processing has been performed for the packet, with in some embodiments the flag being set by the PHY setting a further predetermined reserved field of the packet to a particular value. In addition, in most embodiments the PHYs recalculate and replace checksum values for the packet to account for the changes in values of the other fields of the packet. The PHYs then provide the packets to the SFPs coupled to the switch by the optical links, and the SFPs convert the packets to optical signals and transmit the optical signals to the switch.

Packets outbound from the switch are received over the optical links, converted from optical signals to electrical signals by the SFPs coupled to the optical links, and provided to the PHYs. The PHYs determine if the packet is a PTP packet that was processed by the TCC while inbound to the switch, and if so modify a correction field of the packet to a value including a difference between a time of egress of the packet from the TCC (towards the other optical nodes) and the time of ingress of the packet to the TCC (from the other optical nodes). For modifying the correction field, the PHY determines a time of egress of the packet from the TCC. In most embodiments the PHY estimates, while the packet is resident in the TCC on the outbound path, the time at which egress of the packet from the TCC is expected to occur. In some embodiments the estimated time of egress of the packet from the TCC is the estimated time of egress of the packet from the PHY, with time spent in the TCC between the PHY and transmission by an SFP viewed as negligible. Preferably the estimation is performed when the packet is resident in the PHY at a point at which delays associated with further processing of the packet in the PHY and the TCC are constant. The correction field may therefore be modified by subtracting the time of ingress from the expected time of egress, with the result added to the value in the correction field, prior to modification. In some embodiments the PHYs also reset the flag in the packet indicating that inbound transparent clock processing has been performed for the packet. In some embodiments the PHY resets the flag by resetting the further predetermined reserved field of the packet to a normally expected value, which may be a zero value in some embodiments. In addition, in most embodiments the PHYs recalculate and replace checksum values for the packet to account for the changes in values of the other fields of the packet. The PHYs then provide the packets, in the form of serial data, to the SFPs coupled to the other network nodes by the other optical links, and the SFPs convert the packets to optical signals and transmit the optical signals to the other network nodes.

In some embodiments some of the PHYs are configured to receive and process inbound packets, while others of the PHYs are configured to receive and process outbound packets. In some embodiments each of the PHYs may receive and process both inbound and outbound packets.

Figure 5:
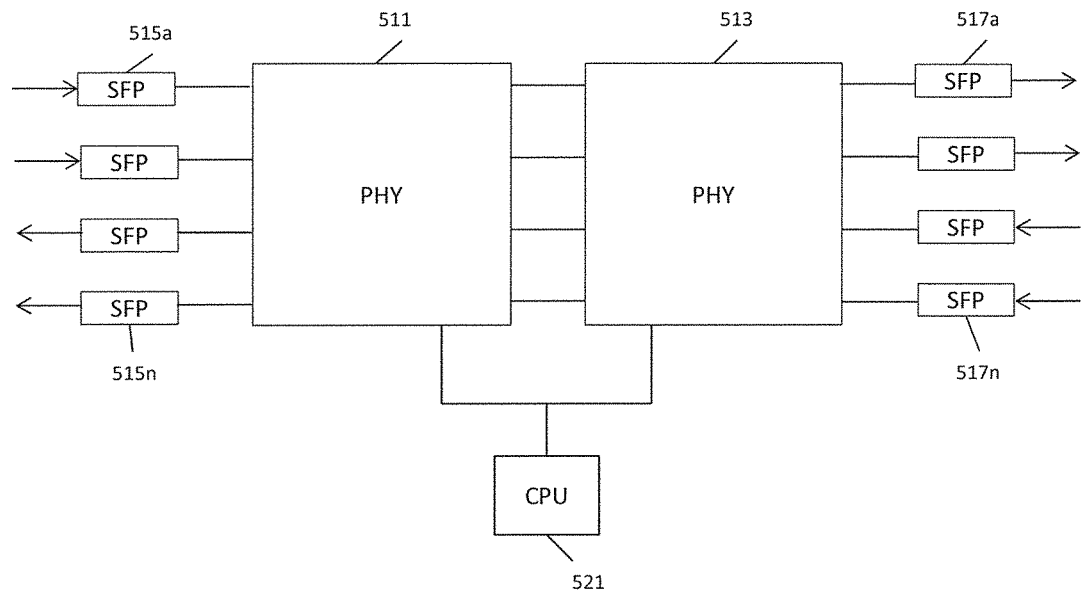
FIG. 5 is a block diagram of a further TCC in accordance with aspects of the invention.

FIG. 5 is a block diagram of a further TCC in accordance with aspects of the invention. In some embodiments the TCC of FIG. 5 may be used as a TCC of FIGS. 1-3. The TCC includes a pair of physical layer devices (PHYs) 511, 513. In some embodiments the TCC includes multiple pairs of PHYs. Of the pair of PHYs, a first PHY 513 is coupled to optical links to a switch by SFPs 517a-n. A second PHY 511 is coupled to other optical links to other network nodes by SFPs 515a-n. The optical links to the switch may be considered an equipment side of the TCC, and the other optical links to the other network nodes may be considered a line side of the TCC. The first and second PHYs are coupled to their respective SFPs by serial data links. The first and second PHYs are also coupled to each other by parallel data links. In various embodiments the parallel data links between the PHYs may be for communication using protocols generally utilized for PHY-MAC communications, for example a version of a Gigabit Media Independent Interface (GMII) or some other interface.

In the embodiment of FIG. 5, the TCC includes a small CPU 521 coupled to the PHYs, for example using a Media Independent Interface Management bus. In some embodiments the CPU configures the PHYs to operate in a desired configuration, for example when the PHYs are configurable to operate in any of a plurality of configurations and a particular configuration is desired for the TCC. In some embodiments the CPU monitors equipment side auto-negotiation by the PHY and commands the PHYs to configure line side modes to be in conformance with a mode indicated by the equipment side auto-negotiation. In some embodiments the CPU also provides for initial synchronization of a time base of the PHYs, with the PHYs maintaining timing synchronization through reception of a common clock signal from a common clock source.

In operation, packets inbound to the switch from other network nodes are received over the other optical links, converted from optical signals to electrical signals by the SFPs coupled to the other optical links, and provided to the second PHY as part of serial data streams. The second PHY determines if the packet is a PTP packet, and if so inserts a value indicative of a time of ingress of the packet to the TCC in a predetermined reserved field of the packet. In some embodiments the second PHY also sets a flag in the packet indicating that inbound transparent clock processing has been performed for the packet, with in some embodiments the flag being set by the second PHY setting a further predetermined reserved field of the packet to a particular value. In addition, in most embodiments the second PHY recalculates and replaces checksum values for the packet to account for the changes in values of the other fields of the packet. The second PHY then provides the packets to the first PHY over the parallel data link. The first PHY serializes the packets, and provides the packets to the SFPs coupled to the switch by the optical links. The SFPs convert the packets to optical signals and transmit the optical signals to the switch.

Packets outbound from the switch are received over the optical links, converted from optical signals to electrical signals by the SFPs coupled to the optical links, and provided to the first PHY. The first PHY deserializes the packet and provides the packet to the second PHY over the parallel data link. The second PHY determines if the packet is a PTP packet that was processed by the TCC while inbound to the switch, and if so modifies a correction field of the packet to a value including a difference between a time of egress of the packet from the TCC (towards the other optical nodes) and the time of ingress of the packet to the TCC (from the other optical nodes). For modifying the correction field, the second PHY determines a time of egress of the packet from the TCC. In most embodiments the second PHY estimates, while the packet is resident in the TCC on the outbound path, the time at which egress of the packet from the TCC is expected to occur. In some embodiments the estimated time of egress of the packet from the TCC is the estimated time of egress of the packet from the second PHY, with time spent in the TCC between the second PHY and transmission by an SFP viewed as negligible. Preferably the estimation is performed when the packet is resident in the second PHY at a point at which delays associated with further processing of the packet in the PHY and the TCC are constant. The correction field may therefore be modified by subtracting the time of ingress from the expected time of egress, with the result added to the value in the correction field, prior to modification. In some embodiments the PHYs also reset the flag in the packet indicating that inbound transparent clock processing has been performed for the packet. In some embodiments the second PHY resets the flag by resetting the further predetermined reserved field of the packet to a normally expected value, which may be a zero value in some embodiments. In addition, in most embodiments the PHYs recalculate and replace checksum values for the packet to account for the changes in values of the other fields of the packet. The second PHY then provides the packets, in the form of serial data, to the SFPs coupled to the other network nodes by the other optical links, and the SFPs convert the packets to optical signals and transmit the optical signals to the other network nodes.

Figure 6:
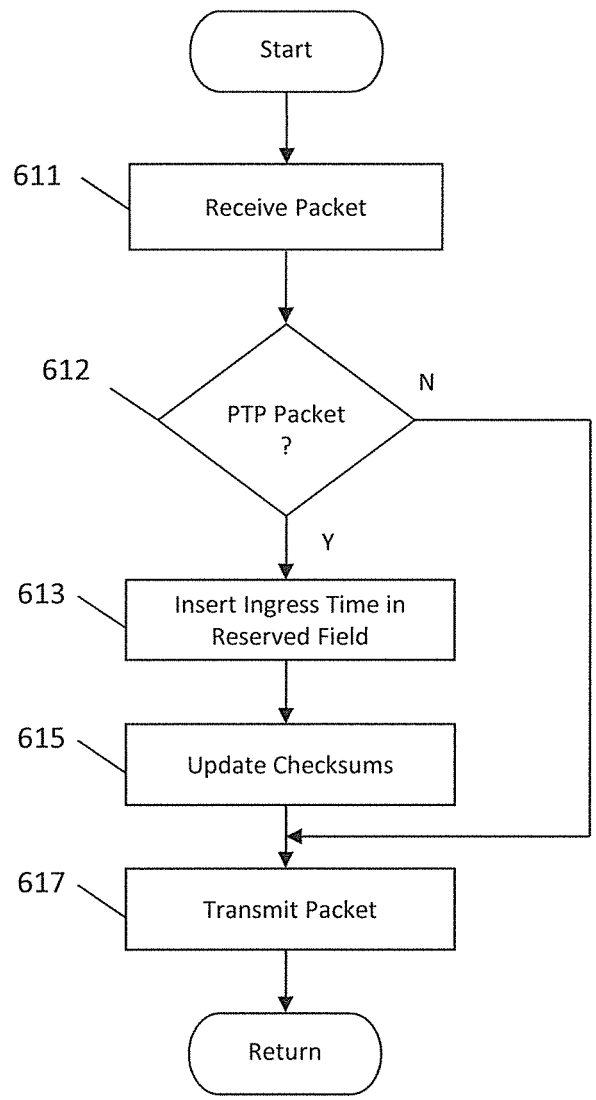
FIG. 6 is a flow diagram of a process for processing packets inbound to a non-PTP network node in order to implement a transparent clock for the node in accordance with aspects of the invention.

FIG. 6 is a flow diagram of a process for processing packets inbound to a non-PTP network node in order to implement a transparent clock for the node in accordance with aspects of the invention. In some embodiments the process is performed by a transparent clock converter, for example a transparent clock converter as discussed with respect to FIGS. 1-5. In some embodiments the process is performed by one or more physical layer devices (PHYs) of a transparent clock converter. In block 611 the process receives information of a packet. In various embodiments the packet is received as part of a serial data stream, and the process deserializes the data stream as part of forming the packet. In block 612 the process determines if the packet is a PTP packet. To determine if the packet is a PTP packet, the process may examine the packet's header, for example.

If the packet is determined to be a PTP packet, the process inserts an ingress time in a predetermined reserved field of the packet's header in block 613. The ingress time is the time at which the packet entered the TCC from a network optical link. In some embodiments the time of entry of the packet into a PHY of the TCC is used as the ingress time.

In block 615 the process updates the packet's checksum. In most embodiments the process recalculates a checksum value for the packet, replacing the checksum value with the recalculated checksum, which takes into account the new value of the reserved field. Once these tasks have been completed, the process transmits the modified packet in block 617. In many embodiments the packet is transmitted as part of a serial data stream, and the process may serialize information of the modified packet prior to transmission. The process then returns.

Figure 7:
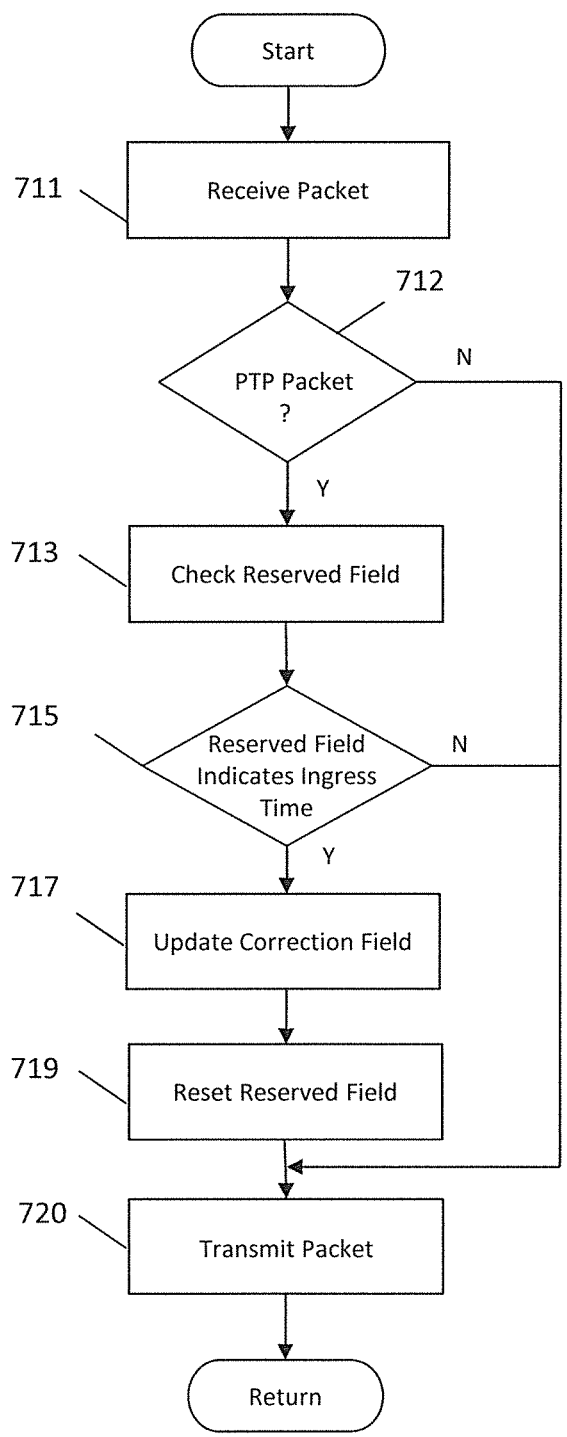
FIG. 7 is a flow diagram of a process for processing packets outbound from a non-PTP node in order to implement a transparent clock for the node in accordance with aspects of the invention.

FIG. 7 is a flow diagram of a process for processing packets outbound from a non-PTP node in order to implement a transparent clock for the node in accordance with aspects of the invention. The process may be performed, for example, by a TCC such as discussed with respect FIGS. 1-5, or one or more PHYs of a TCC. In block 711 the process receives a packet. In various embodiments the packet is received as part of a serial data stream, and the process deserializes the data stream. In block 712 the process determines if the packet is a PTP packet. In block 713 the process checks the reserved field of the packet. In block 715 the process determines if the reserved field has a value indicative of inbound processing by the TCC. For example, in some embodiments a non-zero value in the reserved field indicates inbound processing by the TCC, in some embodiments a value within a predefined range of values in the reserved field indicates inbound processing by the TCC. For example, if the reserved field of the packet indicates a time of ingress to the TCC consistent with processing by the switch, considering a current time, the packet may be considered to have had inbound processing by the TCC.

For packets determined to have no inbound processing, the process transmits the packet in block 720, in most embodiments as part of a serial data stream. For PTP packets that have had inbound processing by the TCC, the process determines a time of egress ($T_E$) of the packet from the TCC, and updates the correction field of the packet to include an indication of an amount of time spent by the packet traversing the TCC and the switch in block 717. In some embodiments the correction field is updated by adding to the correction field a difference between the time of egress and the time of ingress indicated by the reserved field. For example, in some embodiments the outbound packet received by the process includes a value $T_{CF}$ in the correction field, and the process updates the correction field to a value $T_{CF}+T_E-T_I$. As shown in block 719, in most embodiments the process then sets the reserved field to zero, and transmits the packet, in most embodiments as part of a serial data stream, over the optical link in block 720. The process then returns.

Although the invention has been discussed with respect to various embodiments, it should be recognized that the invention comprises the novel and non-obvious claims supported by this disclosure.

What is claimed is:

1. A transparent clock converter, comprising:
   a line side optical transceiver arranged to receive an inbound optical packet and convert the received inbound optical packet to an inbound electrical packet;
   a switch side optical transceiver; and
   a physical layer device coupled to the line side optical transceiver and to the switch side optical transceiver, said physical layer device configured to:
      receive said inbound electrical packet from said line side optical transceiver; and
      identify if said received inbound electrical packet is a timing protocol packet, and in the event that said received inbound electrical packet is identified as a timing protocol packet, place a value indicating a time of reception of the identified timing protocol packet into the transparent clock converter in a reserved field of the identified timing protocol packet to produce a once modified packet, and provide the once modified packet to said switch side optical transceiver, said switch side optical transceiver arranged to convert said once modified packet to optical signals and output said once modified packet optical signals to a switch;

said switch side optical transceiver further arranged to receive said once modified packet as an output optical signal from the switch after switch processing and convert said once modified packet output from the switch to a switched electrical packet;

said physical layer device further configured to:
receive said switched electrical packet;
identify said received switched electrical packet as said once modified packet and modify, responsive to said identification, a correction field of the once modified packet so as to indicate a difference between an expected time of transmission of the packet from the transparent clock converter and the value in the reserved field so as to create a twice modified packet; and provide the twice modified packet to said line side optical transceiver, said line side optical transceiver further arranged to convert said twice modified packet to an output optical packet.

2. The transparent clock converter according to claim 1, wherein said physical layer device is further configured to update a checksum value of the received inbound electrical packet so as to produce the once modified packet.

3. The transparent clock converter according to claim 1, wherein said physical layer device is further configured, while producing said once modified packet, to set a flag in a further reserved field of the received inbound electrical packet to indicate placement of the value in the reserved field.

4. The transparent clock converter according to claim 3, wherein said identification of the once modified packet is responsive to said set flag.

5. The transparent clock converter according to claim 4, wherein said physical layer device is further arranged to clear said set flag when producing said twice modified packet.

6. The transparent clock converter according to claim 1, wherein the expected time of transmission is the expected time of transmission of the output optical packet from the line side optical transceiver.

7. The transparent clock converter according to claim 1, wherein the expected time of transmission is the expected time of transmission of the twice modified packet from the physical layer device to the line side optical transceiver.

8. The transparent clock converter of claim 1, wherein the line side optical transceiver is part of a first small form factor pluggable module.

9. The transparent clock converter of claim 1, wherein the switch side optical transceiver is part of a second small form factor pluggable module.

10. The transparent clock converter according to claim 1, wherein in the event that the received inbound electrical packet is not identified as a timing protocol packet, said physical layer device is configured to provide the received inbound electrical packet to said switch side optical transceiver.

11. The transparent clock converter according to claim 1, further comprising a processor coupled to said physical layer device, the processor arranged to configure said physical layer device for operation as the transparent clock converter.

* * * * *